UNITED STATES PATENT OFFICE 2,551,570

AZO DYE COMPONENTS OF THE AMINO NAPHTHOL SERIES FOR DIAZOTYPES

William H. von Glahn, Loudonville, and Lester N. Stanley, Delmar, N. Y., assignors to General Aniline & Film Corporation, New York, N. Y., a corporation of Delaware No Drawing. Application October 24, 1946, Serial No. 705,474

6 Claims. (Cl. 95—6)

This invention relates to the production of diazotype materials and more particularly to such diazotype materials as are characterized by the presence of certain azo dye components possessing advantageous properties.

Only a few of the azo components hitherto suggested for diazotypes have attained industrial importance due to the failure of most to meet the exacting and varied requirements placed upon photographic diazotype prints. For most purposes to which diazotypes are generally put, the azo components must be stable to precoupling, to decomposition and oxidation, fast to light, insensitive to alkali or alkaline solutions, readily soluble in water and dilute acid solutions but capable of producing azo dyes which are insoluble or wash fast and are capable of reproducing the image in shades of good visual density. In addition to these general properties, when a diazotype is to be used for a production of an intermediate transparency either by the print through or reflex method, the coupling component or azo dye component must be capable of producing a dye which has good photographic density or opacity to ultraviolet light. When the coupling component is incorporated into the diazotype layer in a two-component system, it must also be stable against precoupling with the diazo compound.

Most azo components which have been hitherto employed in the production of diazotypes fail to produce dyes which are wash fast while possessing the necessary degree of stability even though they may possess other qualities which recommend them for diazotype work. We have now found that certain amino naphthol compounds fulfill the requirements as to wash fastness and stability properties quite satisfactorily.

The amino naphthols which have this desirable property belong to the class represented by the formula:

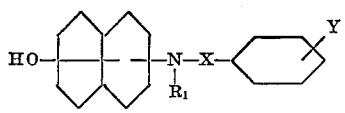

wherein $R_1$ is a member of the group consisting of hydrogen, alkyl and hydroxyalkyl. X is an acid radical selected from the group consisting of —CO and —SO$_2$. Y is a solubilizing group selected from the group consisting of O—SO$_3$H, SO$_3$H, NH$_2$·HCl, N(CH$_3$)$_2$·HCl, NHCH$_3$·HCl, NHC$_2$H$_5$·HCl, N(C$_2$H$_5$)$_2$·HCl.

Typical examples of amino naphthols of this class are:

1. Sulfo benzoyl amino naphthol:

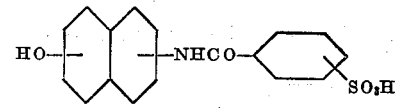

2. Hydrochloride of N-(amino phenyl sulfonyl) amino naphthol:

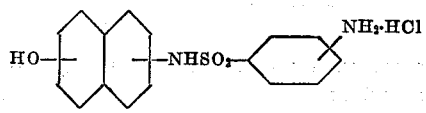

3. N-(sulfo phenyl sulfonyl) amino naphthol:

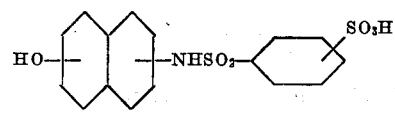

4. 1-(N-3'amino benzoyl)amino - 7 - naphthol hydrochloride:

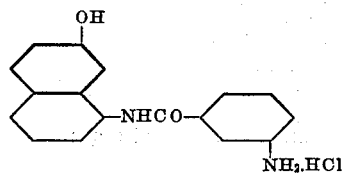

5. 1-(N-4'amino benzoyl)amino - 7 - naphthol hydrochloride:

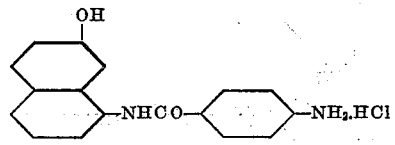

6. 2(N - 3'amino benzoyl)amino-7-naphthol hydrochloride:

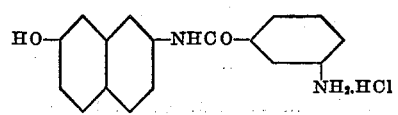

7. 2(N - 4'amino benzoyl)amino-7-naphthol hydrochloride:

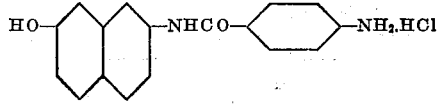

8. 2(N - 3'amino benzoyl)amino - 5 - naphthol hydrochloride:

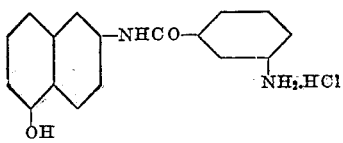

9. 1(N-3'amino benzoyl)amino - 5 - naphthol hydrochloride:

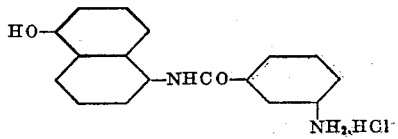

10. 1(N -4'-amino benzoyl)amino-5-naphthol hydrochloride:

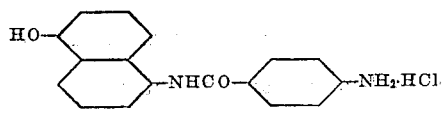

11. 1(N - 3'-amino benzoyl)amino-4-naphthol hydrochloride:

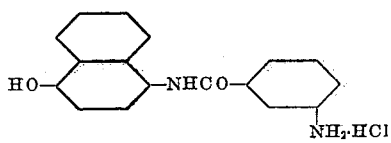

12. 1(N - 4'-amino benzoyl)amino-4-naphthol hydrochloride:

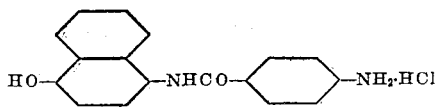

13. N-(3'-amino benzoyl) H acid:

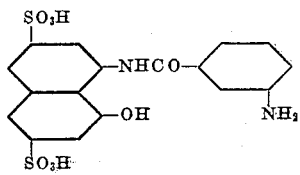

14. N(4'-amino benzoyl) H acid:

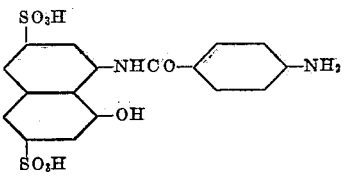

15. 1 - (N - 3'amino benzoyl)amino - 2 - naphthol-4-sulfo acid:

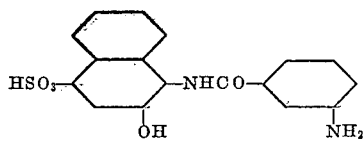

16. 1-(N-4'-amino benzoyl)amino - 2 - naphthol-4-sulfo acid:

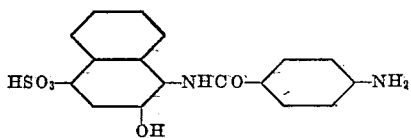

17. 2-(N - 4'-amino benzoyl) -N-methylamino-1-naphthol hydrochloride:

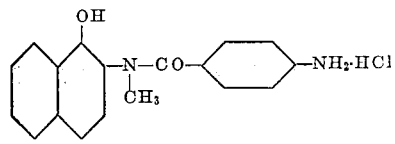

18. 2-(N-4'-amino benzoyl) - N - hydroxyethyl amino-1-naphthol hydrochloride:

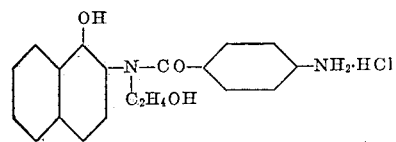

19. 2-(N-sulfophenylacetyl) - amino-1-naphthol:

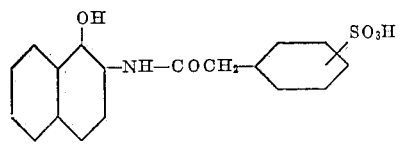

These acylated amino napthols are prepared by condensing the chloride of the acylating compound with the aminonapthol compound followed by such further treatment as may be necessary to produce the desired derivative as, for instance, sulfonation or reduction. Thus the N-(amino benzoyl) aminonaphthols

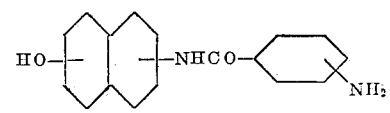

are prepared by condensing nitrobenzoyl chlorides with aminonaphthols followed by reduction of the nitro group. N-substituted as well as unsubstituted amino naphthols may be employed, particularly where the substituent group is alkyl such as methyl, ethyl, propyl and the like or hydroxyalkyl such as hydroxyethyl, hydroxy propyl, hydroxybutyl and the like. For example, 2-methylamino-1-naphthol or 2 - hydroxyethylamino-1-naphthol may be acylated with nitrobenzoyl chloride followed by reduction of the nitro group to produce the products numbered 17 and 18 respectively. Acylation of an aminonaphthol with phenyl acetyl chloride followed by sulfonation produces compounds of the type of number 19.

When sulfo groups are introduced into the acylated amino naphthols, either by using a sulfonated amino naphthol or by sulfonating the acylation product, the wash-fastness of the dye will suffer. However, dyes containing such sulfo derivatives will be more wash-fast than dyes produced from similar azo components having no acyl substituent on the amino group. Whether the aromatic nuclei are or are not substituted by sulfo acid groups, the azo components of this invention may be substituted on the aromatic nuclei by various groups such as alkyl, halogen and the like as long as the solubility characteristics prior to such substitution are not greatly changed and as long as the ability to couple or the coupling energy of the azo component are not appreciably affected.

In the preparation of the diazotype materials, any suitable base ordinarily employed for the reproduction of originals may be used, for instance, such substances as paper—opaque or transparentized; cellulosic films such as are obtained from cellulose acetate, cellulose nitrate, cellulose butyrate and other esters or mixed esters of cellulose and regenerated cellulose; cloth such as linen, cotton, rayon and the like; glass and metal. In the case of two-component dry-developable diazotypes, the azo component may be applied to the support or base together with the diazo compound from an aqueous solution by any of the methods usually employed for the coating of the various types of support. For instance, in the case of paper an aqueous solution of the diazo compound and the azo component together with such other adjuvants as may be employed for improving stability and increasing visual density may be sprayed on or applied by a trough and doctor blade. In the case of cellulosic film, a swelling agent such as isopropyl alcohol is added to the solution of diazo compound, azo component and other adjuvants and the film is coated by drawing it through the sensitizing solution by the dip method or drawing it across the surface of the sensitizing solution by the bead dip method. In the case of more rigid supports, such as glass and metal surfaces, the sensitizing solution may be applied by spraying or brushing. The same methods of application are, of course, employed in the case of a one-component coating where the azo component is not added to the sensitizing solution. Here the sensitizing solution containing the diazo compound and such other adjuvants as may be required by the particular properties of the carrier selected is applied to the carrier and a separate alkaline developing solution is made up containing the azo component. After exposure of the light sensitive diazotype, development is effected by applying the azo component developing solution or by other means known to the art for wet development of diazotypes.

As diazo compounds those derived from p-diamines of the benzene series, particularly those in which the undiazotized amino group is substituted by such groups as alkyl, alkoxy alkyl, aryl, aralkyl, alkylol, cycloaliphatic and heterocyclic groups are preferred although others have been found suitable, particularly where the one component or wet development is employed. Examples of suitable amines of this class from which the diazo compounds may be produced are: p-N-diethylamino aniline; N - hydroxyethyl -N-methylamino-p-aminobenzene; p - amino - diphenylamine; 2,5-diethoxy-4-benzolamino aniline; 1-(N-ethylamino)-2(or 3)-methyl-4-amino - benzene; 4-(N-ethyl-N-hydroxyethylamino)-aniline; 4-(N-diethylamino)-2-(or 3-)ethoxy aniline; 4-(N,N - hydroxyethylamino) - 2 - (or 3)chloro aniline; p-phenylene diamine; 4-N-hydroxyethyl - N - ethylamino- 2 -methyl aniline; 4-N-ethylamino aniline; 4-N,N-dihydroxyethyl amino aniline; p-amino-N-ethyl-N-benzyl aniline; p-amino-N-dimethyl aniline and 4' - methoxy phenyl-2,5-diethoxy aniline. The diazo compounds are used in the form of their stabilized salts such as the $ZnCl_2$, $CdCl_2$ or $SnCl_4$ double salts, the fluoro borates, aryl or alkyl sulfonates and acid sulfates of the diazonium compound.

The following examples will serve to illustrate preferred methods of carrying out the invention but are not intended to limit the scope thereof. Unless otherwise stated, the parts are by weight.

Example 1

Paper stock is impregnated with a solution containing per 100 cc. of water:

2.4 g. 1-(N-3'aminobenzoyl) amino-7-naphthol hydrochloride 2.1 g. N - diethylamino - p - benzene diazonium chloride $ZnCl_2$ double salt 8.0 g. citric acid 4.0 g. thiourea The thus impregnated paper when dried and stored has excellent precoupling stability. When exposed to actinic light of the ultraviolet range under a positive original and developed with ammonia vapor, the image of the original is developed as a positive in a purplish blue shade on a clear white background. Upon being subjected to wetting tests, it is found that this purplish blue positive image has excellent wash-fastness.

Upon substituting 1 - (N - 4'aminobenzoyl) - amino-7-naphthol for the 1-(N-3'aminobenzoyl)-amino-7-naphthol as the azo component of this example, a dye image of the same shade will be obtained having the same properties of precoupling stability and wash-fastness.

Example 2

Paper stock is impregnated with a solution containing per 100 cc. of water:

2.4 g. 1-(N-3'aminobenzoyl)amino - 7 - naphthol hydrochloride 2.6 g. 2,5 diethoxy-4-benzoylamino-benzene diazonium chloride-$ZnCl_2$ double salt 8.0 g. citric acid 4.0 g. thiourea The thus coated paper is dried and stored under average conditions of temperature and humidity and it is found to have good precoupling stability. Upon exposing to actinic light of the ultra violet range under an original design and developing with ammonia vapors, a positive reproduction of the original is obtained in a purplish blue shade which is slightly redder than that of Example 1 but which has the same good wash-fastness properties as characterized the product of Example 1.

Example 3

Transparentized paper is coated with a coating solution containing per 100 cc. of water:

2.4 g. 2-(N-3'aminobenzoyl)amino - 7 - naphthol hydrochloride 2.0 g. 1-(N-ethylamino)-2-methyl-4-benzene diazonium chloride-$ZnCl_2$ double salt 8.0 g. citric acid 4.0 g. thiourea The coated transparency which has been dried and stored has excellent precoupling stability and when exposed to ultraviolet light under an original and developed with gaseous ammonia gives a sepia dye positive reproduction of the original on a clear background. This sepia dye image has excellent wash-fastness properties and has very good opacity to ultraviolet light. Upon subsequent exposure and development of other light-sensitive reproduction media, using the sepia dye image of this example as an original, excellent reproductions are obtained on the second light-sensitive reproduction media.

Upon substituting 1-(N-4'amino benzoyl) amino-5-naphthol hydrochloride for the azo component of this example, a coating is obtained which reproduces the image of the original upon exposure and development in a sepia shade having the same properties as that produced by the components of this example.

Example 4

Transparentized paper is coated with a coating solution containing per 100 cc. of water:

2.4 g. 2-(N-4'aminobenzoyl)amino-7-naphthol hydrochloride
2.2 g. 1-(N-phenyl)-4-benzene diazonium acid sulfate
8.0 g. citric acid
4.0 g. thiourea The coated transparency which has been dried and stored has excellent precoupling stability and when exposed to ultraviolet light under an original and developed with gaseous ammonia gives a sepia dye positive reproduction of the original on a clear background. This sepia dye image has excellent wash-fastness properties and has very good opacity to ultraviolet light. Upon subsequent exposure and development of other light-sensitive reproduction media, using the sepia dye image of this example as an original, excellent reproductions are obtained on the second light-sensitive reproduction media.

Example 5

Transparentized paper is coated with a coating solution containing per 100 cc. of water:

2.4 g. 2-(N-3'aminobenzoyl)amino-5-naphthol hydrochloride
2.2 g. N-methyl, N-hydroxyethyl-amino-p-benzene diazonium chloride-$ZnCl_2$ double salt
8.0 g. citric acid
4.0 g. thiourea The coated transparency which has been dried and stored has excellent precoupling stability and when exposed to ultraviolet light under an original and developed with gaseous ammonia gives a sepia dye positive reproduction of the original on a clear background. This sepia dye image has excellent wash-fastness properties and has very good opacity to ultraviolet light. Upon subsequent exposure and development of other light-sensitive reproduction media, using the sepia dye image of this example as an original, excellent reproductions are obtained on the second light-sensitive reproduction media.

On substituting 2.1 g. N-diethyl-amino-p-benzene diazonium chloride-$ZnCl_2$ double salt for the diazo compound of this example, a coating is obtained which reproduces the image of the original in a sepia shade having the same properties as that produced by the components of this example.

Example 6

Transparentized paper is coated with a coating solution containing per 100 cc. of water:

2.4 g. 2-(N-4'-aminobenzoyl)amino-5-naphthol hydrochloride
2.3 g. N-ethyl, N-hydroxyethyl-amino-p-benzene diazonium chloride-$ZnCl_2$ double salt
8.0 g. citric acid
4.0 g. thiourea The coated transparency which has been dried and stored has excellent precoupling stability and when exposed to ultraviolet light under an original and developed with gaseous ammonia gives a sepia dye positive reproduction of the original on a clear background. This sepia dye image has excellent wash-fastness properties and has very good opacity to ultraviolet light. Upon subsequent exposure and development of other light-sensitive reproduction media, using the sepia dye image of this example as an original, excellent reproductions are obtained on the second light-sensitive reproduction media.

Example 7

Paper stock is impregnated with a coating solution containing per 100 cc. of water:

2.4 g. 1-(N-3'aminobenzoyl)amino-4-naphthol hydrochloride
2.1 g. N-diethylamino-p-benzene diazonium chloride-$ZnCl_2$
8.0 g. citric acid
4.0 g. thiourea The thus coated paper after drying is stored under average conditions of temperature and humidity and is found to have excellent precoupling stability. Upon being exposed to ultraviolet light under an original design and developed with ammonia vapors, the image of the original is reproduced in a blue shade with a clear white background. Upon subjecting this developed image to wetting, it is found that it possesses excellent wash-fastness properties.

Upon substituting 1-(N-4'aminobenzoyl)amino-4-naphthol hydrochloride for the azo component of this example, coatings are obtained having the same properties as those obtained in accordance with this example and which reproduce the image in the same shade having the same wash-fastness properties.

Example 8

Paper stock is coated with a coating solution containing per 100 cc. of water:

2.8 g. N-(3'-aminobenzoyl) H-acid
2.1 g. N-diethylamino-p-benzene diazonium chloride-$ZnCl_2$ double salt
8.0 g. citric acid
4.0 g. thiourea After drying the thus coated paper, it is stored and subjected to accelerated aging tests which show that it has good precoupling stability. Upon comparison with similar coatings containing H-acid as the azo component, it is indicated that the precoupling stability of the coating obtained in accordance with this example is superior. On exposure to ultraviolet light under an original pattern and development by contact with ammonia vapors, the image of the original is reproduced in a bright blue shade on a clear white background.

Upon substituting N-(4'aminobenzoyl) H-acid for the N-(3'aminobenzoyl) H-acid azo component of this example, coatings having the same properties are obtained.

Example 9

Transparentized paper is coated with a coating solution containing per 100 cc. of water:

2.6 g. 1-(N-3'aminobenzoyl)amino-2-naphthol-4-sulfo acid
2.2 g. N-methyl, N-hydroxyethylamino-p-benzene diazonium chloride-$ZnCl_2$ double salt
8.0 g. citric acid
4.0 g. thiourea After drying the coated transparency, it is stored under average conditions of humidity and temperature and subjected to accelerated aging tests. Its precoupling stability thus determined is excellent. Upon reproducing an original pattern by exposing the coated transparent paper under an original positive, the image of the original is reproduced after development in a sepia shade which has good opacity to ultraviolet light. Upon using the sepia reproduction as an original and exposing further diazotype reproduction media under it, further reproductions of excellent quality can be obtained.

Upon substituting 1-(N-4'aminobenzoyl)amino-2-naphthol-4-sulfo acid for the azo component of this example, coatings having the same properties and reproducing original images having the same properties as those produced in accordance with this example may be obtained.

We claim:

1. Diazotype materials comprising a light-sensitive diazo compound suitable for two-component diazotype compositions and an amino naphthol selected from the class consisting of those represented by the formula:

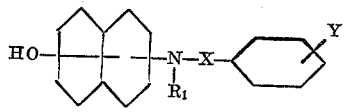

wherein $R_1$ is a member of the group consisting of hydrogen, alkyl, and hydroxy alkyl. X is an acid radical of the group consisting of —CO and —SO$_2$. Y is a member of the group consisting of NH$_2$·HCl, NH$_2$, N(CH$_3$)$_2$·HCl, NHCH$_3$·HCl, NHC$_2$H$_5$·HCl, and N(C$_2$H$_5$)$_2$·HCl groups and such compounds substituted on the aromatic nuclei by substituents which do not affect solubility or coupling characteristics.

2. Diazotype materials of claim 1 wherein the light-sensitive diazo compound is derived from a p-phenylene diamine.

3. Diazotype materials comprising a light-sensitive diazo compound derived from a p-phenylene diamine and an azo dye coupling component selected from the class represented by the formula:

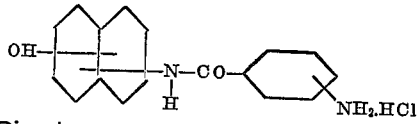

4. Diazotype materials comprising a light-sensitive diazo compound derived from a p-phenylene diamine and an azo dye coupling component having the formula:

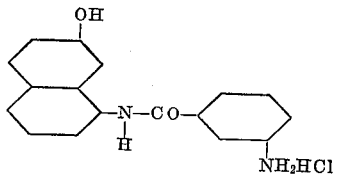

5. Diazotype materials comprising a light-sensitive diazo compound derived from a p-phenylene diamine and an azo dye coupling component having the formula:

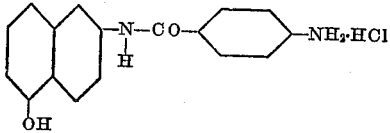

6. Diazotype materials comprising a light-sensitive diazo compound derived from a p-phenylene diamine and an azo dye coupling component having the formula:

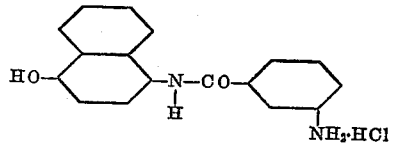

WILLIAM H. von GLAHN.
LESTER N. STANLEY.

REFERENCES CITED

The following references are of record in the file of this patent:

UNITED STATES PATENTS

| Number | Name | Date |
|---|---|---|
| 1,870,930 | Sprongerts | Aug. 9, 1932 |
| 1,936,957 | Schmidt | Nov. 28, 1933 |
| 2,150,565 | Schmidt | Mar. 14, 1939 |
| 2,196,950 | Zahn | Apr. 9, 1940 |
| 2,233,038 | Sus | Feb. 25, 1941 |
| 2,298,444 | Weissberger | Oct. 13, 1942 |
| 2,369,929 | Vittum et al. | Feb. 20, 1945 |
| 2,375,366 | Jacobus | May 8, 1945 |
| 2,448,158 | Sparks et al. | Aug. 31, 1948 |